United States Patent [19]

Schütte et al.

[11] Patent Number: 4,629,197

[45] Date of Patent: Dec. 16, 1986

[54] CONE CRUSHER LABYRINTH SEAL

[75] Inventors: Klaus Schütte, Cologne; Helmut Stöckmann, Wesseling, both of Fed. Rep. of Germany

[73] Assignee: Klockner-Humboldt-Deutz Aktiengesellschaft, Fed. Rep. of Germany

[21] Appl. No.: 764,228

[22] Filed: Aug. 9, 1985

[30] Foreign Application Priority Data

Aug. 10, 1984 [DE] Fed. Rep. of Germany ....... 3429467

[51] Int. Cl.[4] ........................ F16J 15/447; F16J 15/40

[52] U.S. Cl. ........................................ 277/53; 277/12; 277/56; 277/135

[58] Field of Search ........................ 277/12, 32, 53–58, 277/135, 237

[56] References Cited

U.S. PATENT DOCUMENTS

| | | | |
|---|---|---|---|
| 2,005,429 | 6/1935 | Lichtenstein | 277/53 X |
| 2,740,647 | 4/1956 | Van Pelt | 277/56 X |
| 2,891,808 | 6/1959 | Richardson | 277/53 |
| 3,343,891 | 9/1967 | Shipman | 277/55 X |
| 4,132,416 | 1/1979 | Adams | 277/53 X |

FOREIGN PATENT DOCUMENTS

| | | | |
|---|---|---|---|
| 123283 | 1/1947 | Australia | 277/56 |
| 470121 | 1/1929 | Fed. Rep. of Germany | 277/57 |
| 479388 | 7/1929 | Fed. Rep. of Germany | 277/56 |
| 659280 | 4/1938 | Fed. Rep. of Germany | 277/55 |
| 1075927 | 8/1960 | Fed. Rep. of Germany . | |
| 470015 | 3/1952 | Italy | 277/57 |
| 227315 | 1/1925 | United Kingdom | 277/54 |
| 296656 | 9/1928 | United Kingdom | 277/53 |

*Primary Examiner*—Robert S. Ward
*Attorney, Agent, or Firm*—Hill, Van Santen, Steadman & Simpson

[57] ABSTRACT

Washing out of a grease fill and loss of the barrier effect with respect to dust is avoided in a labyrinth seal of a cone crusher, the labyrinth seal comprising a vertical labyrinth filled with grease and a horizontal labyrinth formed of at least one groove on the circumference of the inner sealing half and of at least one groove, and webs, on the inner circumference of the outer sealing half of the labyrinth seal.

10 Claims, 2 Drawing Figures

CONE CRUSHER LABYRINTH SEAL

BACKGROUND OF THE INVENTION

1. Field of the Invention

The present invention relates to a cone crusher, and particularly to a cone crusher having a eccentrically driven crushing cone and a labyrinth seal disposed between an eccentric drive and the cone crusher housing, the inner sealing half of the labyrinth seal being connected to the eccentric drive of the crushing cone and the outer sealing half being connected to the housing.

2. Description of the Prior Art

The German patent No. 1,075,927 discloses a cone crusher of the general type set forth above. This cone crusher comprises a labyrinth seal between an eccentric bushing and the crusher housing as well as between the eccentric bushing and the crushing cone. The labyrinth seal between the eccentric bushing and the crusher housing is composed of interlocking webs and can be horizontally or vertically disposed. The seal is filled with grease for protection against the entry of dust. Given this seal, the risk is not entirely excluded that, due to the lack of a suitable protection, the labyrinth seal grease can be washed out by lubricating oil which serves the purpose of lubricating and cooling the bevel gears of the eccentric drive. Heated lubricating oil, in particular, has very good creep properties and also migrates up along perpendicular surfaces. This creep is particularly promoted during operation of the cone crusher by the conveying effect of turning riffles or turning grooves which the surfaces of the rotating parts comprise after a chip removing processing. When the component carrying the labyrinth seal which is connected to the rotating eccentric bushing comprises such turning riffles, the heated oil can easily penetrate into the labyrinth seal and wash out the grease filling. Due to the washing out of the grease, the labyrinth seal will become accessible for dust of the crushing stock and the risk would exist that dust penetrates to the oil circulation for the lubrication of the drive and the bearing of the cone crusher. Within a short time, however, the dust will destroy the bearing due to wear. Furthermore, the oil loss, as well as the contamination of the crushing stock by the emerging oil, are undesirable.

SUMMARY OF THE INVENTION

Given a cone crusher, it is therefore the object of the present invention to approve the labyrinth seal between the eccentric drive and the housing such that the lubricating oil cannot penetrate into the labyrinth and wash out the grease and, thereby, create a possible entry for dust. A particularly space-saving structure having a low overall height is attendant to the resolution of the above object.

The object is achieved, according to the present invention, in that the labyrinths of the sealing halves are essentially vertically and horizontally disposed. The vertical labyrinth is filled with grease and protects the interior of the cone crusher, and, therefore, the oil circulation, advantageously against the entry of dust from the crushing stock chamber and also protects against water entry. The horizontal labyrinth, in turn, very advantageously protects the vertical labyrinth against washing out of the grease due to creep and splash oil which could otherwise proceed from the region of the eccentric drive into the sealing region.

According to a feature of the invention, the vertical labyrinth is composed of interlocking webs and the horizontal labyrinth is composed of at least one groove respective applied to the outer circumference of the inner sealing hal and to the inner circumference of the outer sealing half and of at least one web on the inner circumference of the outer sealing half. The grooves and webs advantageously prevent a creeping of the oil because the oil film breaks at the webs and is dammed up into the grooves.

According to another feature of the invention it is provided that the grooves of the inner sealing half are disposed extending obliquely descending from inside towards the outside to the sealing gap and the grooves at the outer sealing half are disposed extending in a descending manner from the outside towards the inside. The obliquely extending grooves provide a particularly effective protection against oil creep. The upward-creeping oil collects in the grooves in the upright, outer sealing half as in pockets, until it becomes so heavy due to the collective quantity that it begins to flow down. The pressure of the downwardly-flowing oil opposes the pressure of the ascending oil. In the turning, inner sealing half, the oil which collects in the grooves is hurled out against the upright outer sealing half due to centrifugal forces. It is particularly the obliquely extending, upper limiting surface of the grooves which thereby advantageously forces the oil drops into a motion which is directed obliquely downwardly. The oil, therefore, is conducted away from the vertical labyrinth.

According to another feature of the invention, the upper edge of the uppermost groove of the horizontal labyrinth in the outer sealing half lies above the upper edge of the uppermost groove of the inner sealing half. By this measure it is assured that no oil that is hurled from the uppermost groove of the rotating, inner sealing half can creep up at the opposite, outer sealing half.

According to another feature of the invention, the outer sealing half lying opposite the uppermost groove of the inner sealing half comprises, instead of the uppermost groove, an annular wall surface downardly inclined from inside to outside. This structural design, according to the present invention, is advantageous when a groove cannot be provided for reasons of space or material. A creep of the oil is avoided due to the overhand of the surface.

It is provided, according to a further feature of the invention, that at least one web on the circumference of the outer sealing half, preferably the lowermost web, has an inner diameter which is smaller than the spacing of the center line of the sealing gap from the pivot point of the inner sealing half. When the sealing gap is covered at least beyond the center line, the gap coverage by the web advantageously largely prevents an unimpeded splashing of the warm, low-viscosity lubricating oil which is hurled from the bevel pinion and gear into the sealing gap.

According to another feature of the invention, it is provided that the webs on the inner circumference of the outer sealing half are provided with vertical clearances which are offset relative to one another. In an advantageous manner, the flow-off of the oil collecting between the webs is thereby facilitated. Simultaneously, however, the offset arrangement of the clearances makes it possible for the oil to find a path for ascending in the clearances.

In accordance with a further feature of the invention, the outer sealing half and/or the vertical labyrinth path of the inner sealing half are respectively designed as one-piece, interchangeable parts. Given the onepiece nature of the respective sealing half, a greater accuracy of is advantageously guaranteed than would be the case given an assembly of the sealing half from the plurality of parts.

According to a further feature of the invention, it is provided that the outer sealing half and/or the vertical labyrinth part of the inner sealing half are disposed displaceable in the vertical direction. The displaceability of the respective sealing halves advantageously offers the possibility of compensating the assembly tolerances which are provided for the assembly of the bevel gears of the eccentric drive.

It is also provided, according to another feature of the invention, that at least one respective fitting ring is disposed beneath the outer sealing half and/or beneath the vertical labyrinth part of the inner sealing half or that the respectively interchangeable parts of the labyrinths are designed as fitting parts. As a result thereof, the sealing gap between the two sealing halves can be advantageously always set the same, i.e. optimally, independently of the play between the two bevel gears.

According to another feature of the invention, the outer sealing half or the inner sealing half at the outer end of the vertical labyrinth is provided with at least one sealing lip. The inside of the sealing lip effectively prevents the emergence of grease and its outside prevents the penetration of dust into the gap between the two sealing halves.

Advantageously, and in accordance with the above feature of the invention, the sealing lip may be designed as a replaceable ring. As a consequence, the sealing lip can be easily replaced as needed.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
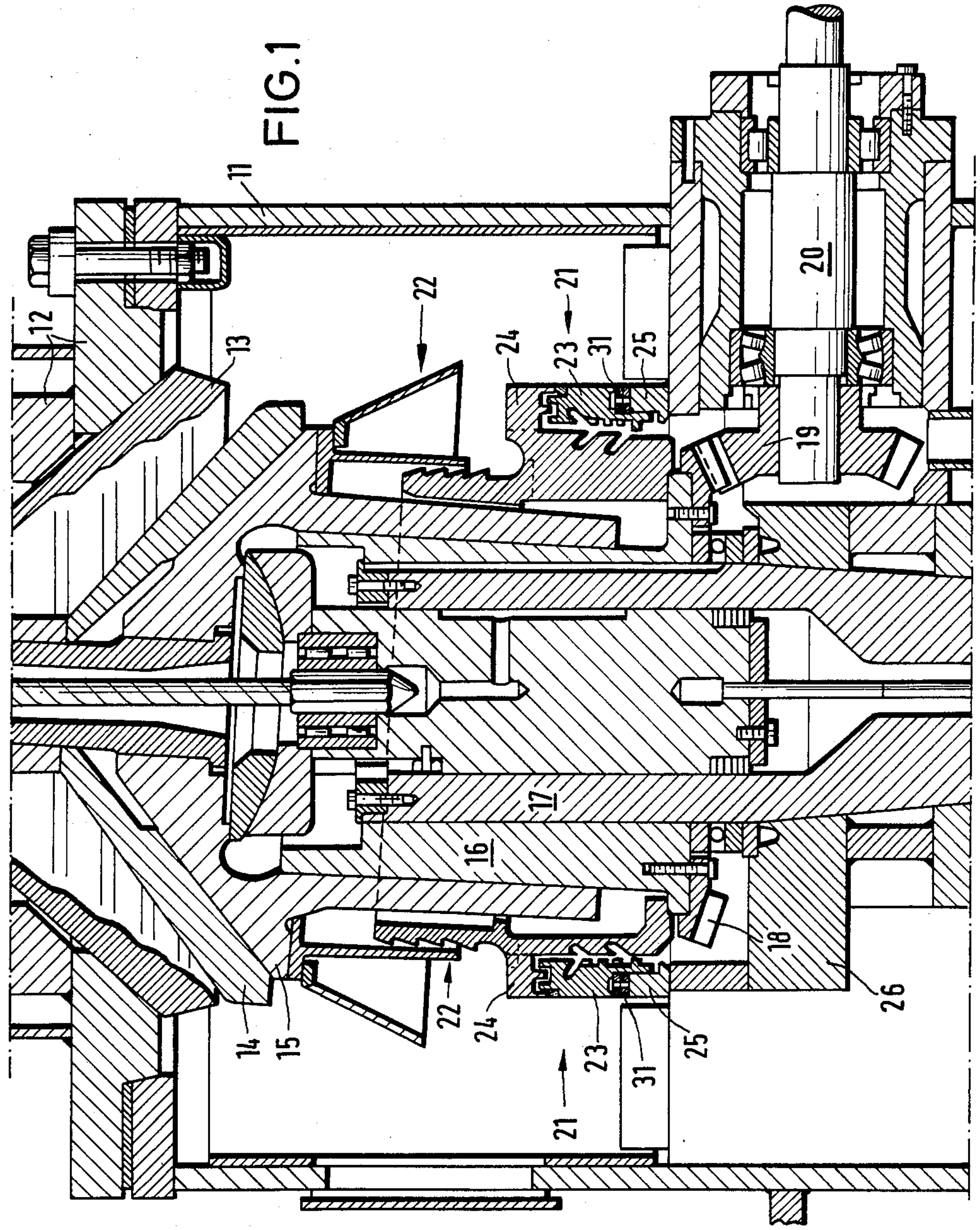
FIG. 1 is a vertical sectional view of a cone crusher comprising an exemplary embodiment of a labyrinth seal constructed in accordance with the present invention.

As FIG. 1 illustrates, the housing of the cone crusher comprises a lower housing part 11 and an upper housing part 12 secured thereto. Disposed within the housing parts 11, 12 as crushing tools are an upper conical crusher jacket 13 and a crusher jacket 14 seated therebelow and secured to a carrying cone 15. The carrying cone 15, with the crusher jacket 14, is mounted on an eccentric bushing 16 which, in turn, is slidingly carried on a cylindrical hollow shaft 17.

The eccentric bushing 16 is driven by a drive motor (not shown on the drawing), being driven via a bevel gear rim 18 by way of a bevel pinion 19 carried on a drive shaft 20.

The cone crusher is equipped with a lower labyrinth seal and an upper labyrinth seal. The lower labyrinth seal 21, according to the present invention, is disposed between the eccentric drive 16, 18, 19, 20 of the crusher jacket 14 and the housing 11, 12, whereby the upper, known labyrinth seal 22 is located between the carrying cone 15 and the eccentric bushing 16.

The lower labyrinth seal 21, according to the present invention, comprises an outer, stationary sealing half 23 and an inner, rotating sealing half 24. The outer sealing half 23 is secured to a ring 25 which is connected to the housing 11, 12 by way of a hub 26 surrounding the cylindrical hollow shaft 17. The inner sealing half 24 is designed as a annular off-center mass of the eccentric bushing 16 or, comprises discrete components, and is secured to the off-center mass. The labyrinth seal 21 is composed of a respective vertical labyrinth 37 (FIG. 2) and a horizontal labyrinth 38 (FIG. 2).

Figure 2:
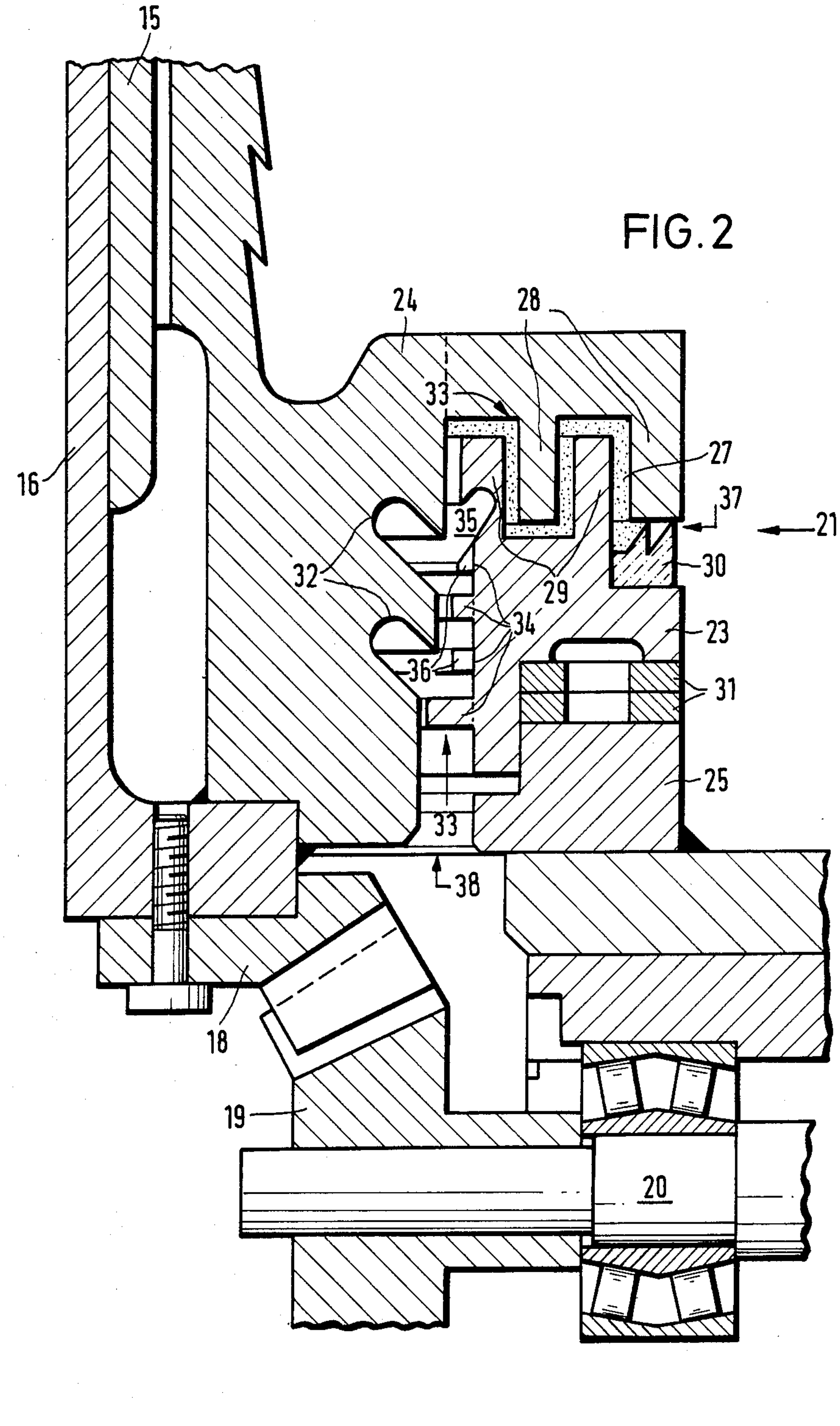
FIG. 2 is a fragmentary view of the labyrinth seal of FIG. 1 shown on an enlarged scale.

The structure of the labyrinth seal of the present invention is illustrated in greater detail in FIG. 2. The vertical labyrinth 37 is formed of interlocking webs 28 of the inner sealing half 24 and webs 29 of the outer sealing half 23, whereby the sealing gap 33 between the sealing halves is filled with grease 27.

The grease 27 is held between the webs 28, 29 and a double sealing lip 30 protects against grease loss and dust entry at the exterior. The double sealing lip 30 is designed as a replaceable part. It can be manufactured of wear or, respectively, wearable materials such as, for example, bronzes, plastics or rubber. Given integration of the sealing lip 30, the lips contact the web 28 of the inner sealing half 24 and grind in by themselves during operation. The tightness is thereby increased.

The sealing gap 33 between the outer sealing half 23 and the inner sealing half 24 in the vertical labyrinth 37 should not change due to the fill with grease 27 and should always have the same width. The outer sealing half 23 is therefore fabricated as an adjustable part. By way of correspondingly dimensioned, underlaid fitting rings 31, the sealing gap 33 can be optimally set to any desired width. Any manufacture-conditioned tolerance for setting the engagement of the bevel pinion 19 and the bevel gear 18 can therefore be compensated. Reworking of the outer sealing half 23 is therefore eliminated. The outer sealing half 23 can therefore be advantageously manufactured of one piece, for example, as a cast member. Depending on the structural type of the cone crusher, it can also be advantageous to respectively execute the inner sealing half 24, or even both sealing halves, as a replaceable part or parts. Space-saving designs having a low overall height are possible on the basis of this advantageous design in accordance with the present invention.

The horizontal labyrinth 38 is not fashioned in the form of interlocking webs. The vertical dismantling of the crusher cone 14 with its carrying cone 15 and the eccentric bushing 16 is therefore considerably facilitated. The labyrinth seal 21 need not be dismantled.

In the horizontal labyrinth 38, the turning, inner sealing half 24 connected to the off-center mass of the eccentric bushing 16, comprises grooves 32 which extend towards the sealing gap 33 in an obliquely descending manner from the inside towards the outside. As a consequence of the undercut, the circumferential speed and, consequently, the rate of descent of the oil decreases toward the pivot point. The oil ascends more slowly at the slanted surfaces of the grooves 32. The oil collects in the grooves 32 and, after a certain size of the drops, attempts to flow downwardly again. As a consequence of the obliquely inwardly directed moving parts, the oil is thereby hurled away from the vertical labyrinth 37 against the inner wall of the outer sealing half 23.

The outer sealing half 23 comprises circumferential webs 34 in the horizontal labyrinth 38 and at least one groove 35. The oil displaced from the inside sealing half 24 due to the rotational motion is therefore prevented from uniting with the oil ascending at the outer sealing half 23 and likewise creeping up. The oil collects between the webs 34 of the outer sealing half 23 and flows through the offset clearances 36 into the webs 34.

As a measure against oil which could be hurled from the bevel gear 18 and the bevel pinion 19 into the sealing gap 33, one of the webs 34, here the lowermost web, by way of example, extends sufficiently that it largely covers the sealing gap without thereby impeding the possibility of assembly and disassembly of parts.

The groove 35 likewise comprises an inclination directed toward the sealing gap 33. The upper edges of the groove 35 in the outer sealing half 23 lie above the upper edge of the uppermost groove 32 of the inner sealing half 24. Should oil still have proceeded into the uppermost groove 32 of the inner sealing half 24 and be hurled out due to the rotational motion, it is intercepted in the groove 35. The downwardly inclined, upper groove wall reliably prevents an ascent of the oil into the vertical labyrinth 37 and, therefore, prevents a washing out of the grease 27.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a cone crusher of the type in which a crushing cone is driven in a housing by an eccentric drive and in which a labyrinth seal includes an annular inner sealing member connected to and rotatable with the eccentric drive about an axis of rotation and an annular stationary outer sealing member connected to said housing, the improvement in the labyrinth seal comprising:

a first labyrinth portion extending vertically;

a second labyrinth portion extending horizontally;

said second labyrinth comprising a gap and said outer sealing member comprising a plurality of peripheral webs on said outer sealing member, the lowermost of said webs having a predetermined inner diameter which is less than the diameter between the center line of said gap and the axis of rotation; and each of said webs including at least one vertical opening therethrough offset from the like openings of the other webs.

2. In a cone crusher of the type in which a crushing cone is driven in a housing by an eccentric drive and in which a labyrinth seal includes an annular inner sealing member connected to and rotatable with the eccentric drive about an axis of rotation and an annular stationary outer sealing member connected to the housing, the improvement in the labyrinth seal comprising:

a first labyrinth portion extending vertically;

a second labyrinth portion extending horizontally; and mounting means adjustably mounting said outer sealing member for vertical adjustment, said mounting means comprising at least one ring between said outer sealing member and said eccentric drive.

3. A labyrinth seal structure comprising:

a rotatable member to be driven by an oil-lubricated drive and including a radially extending portion having a first peripheral surface, and a second peripheral surface radially inward of said first peripheral surface;

a fixed member including an inner surface spaced from said second peripheral surface and a plurality of spaced annular first webs extending towards said radially extending portion;

a plurality of spaced annular second webs extending from said rotatable member into the spaces between and spaced from said first webs to therewith define a first labyrinth for receiving a grease fill;

a seal between said fixed member and said radially extending portion sealing said first labyrinth adjacent said first peripheral surface;

a plurality of spaced annular third webs extending from said inner surface into the space between said fixed and rotatable members to define a second labyrinth adjacent the drive, one of said annular third webs nearest to the drive extending to a location greater than one-half of the space between said rotatable and fixed members;

at least one first oil trap, to collect oil due to oil creep, comprising a first groove extending from said second peripheral surface obliquely away from the drive into said rotatable member; and at least one second oil trap extending from said inner surface obliquely into said fixed member at a location, with respect to the drive, beyond said at least one first oil trap.

4. The labyrinth seal structure of claim 3, wherein:

each of said third webs comprises openings therethrough, the openings of said third webs being arcuately offset from one another.

5. In a cone crusher of the type in which a vertically disposed crushing cone is driven in a housing by an eccentric drive and in which a labyrinth seal includes an annular inner sealing member connected to and rotatable with the eccentric drive about a vertical axis of rotation and an annular stationary outer sealing member connected to the housing, the improvement in the labyrinth seal comprising:

a first labyrinth portion extending vertically;

a second labyrinth portion extending horizontally;

said first labyrinth portion comprising a plurality of spaced internesting vertical webs on said inner and outer sealing members defining a first gap for receiving a grease fill;

a second gap defined by the outer surface of said inner sealing member and the inner surface of said outer sealing member, at least one groove in each of said inner and outer surfaces each extending circumferentially and into said second gap, and a plurality of peripheral webs extending from said inner surface of said outer sealing member, the lowermost one of said webs extending to a point short of said outer surface of said inner sealing member and having a predetermined inner diameter which is less than the diameter between the center line of said second gap and the axis of rotation;

said inner sealing member comprising a plurality of annular grooves opening into said first gap;

said outer sealing member comprising an annular wall surface lying opposite the uppermost of said plurality of grooves and extending inclined downwardly into said first gap;

said inner sealing member being a one-piece releasably mounted part and comprising sections of said first and second labyrinth portions; and mounting means adjustably mounting one of said sealing members for vertical adjustment.

6. The improved cone crusher labyrinth seal of claim 5, wherein:

said inner sealing member comprises a plurality of said circumferential grooves, each of said circumferential grooves extending obliquely down into said second gap.

7. The improved cone crusher labyrinth seal of claim 6, wherein:

the uppermost circumferential groove in said inner surface of said outer sealing member is partially defined by said annular wall surface.

8. The improved cone crusher labyrinth seal of claim 5, wherein:

said mounting means comprises at least one ring between said outer sealing member and said eccentric drive.

9. The improved cone crusher labyrinth seal of claim 5, and further comprising:

a further labyrinth seal including at least one seal lip and a seal surface, said further labyrinth seal located at the radial terminus of said first gap with said at least one lip engaging one of said sealing members and said seal surface engaging the other of said sealing members.

10. The improved cone crusher labyrinth seal of claim 9, wherein:

said further labyrinth seal comprises a replaceable ring.

* * * * *